Patented Dec. 15, 1942

2,304,889

UNITED STATES PATENT OFFICE 2,304,889

ANTHRAQUINONE COMPOUND

Joseph B. Dickey and James G. McNally, Rochester, N. Y., assignors to Eastman Kodak Company, Rochester, N. Y., a corporation of New Jersey No Drawing. Application May 17, 1940, Serial No. 335,821

1 Claim. (Cl. 260—376)

This invention relates to a new anthraquinone dye compound.

We have discovered that anthraquinone compounds containing a

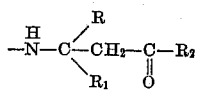

group, wherein R, $R_1$ and $R_2$ each represents an alkyl group, attached directly to an alpha position of the anthraquinone nucleus constitute a valuable class of dye compounds. The nuclear unsulfonated dye compounds of our invention can be employed to color organic derivatives of cellulose and it is to these nuclear unsulfonated dye compounds and their application for the coloration of organic derivatives of cellulose that our invention is particularly directed. These nuclear unsulfonated dye compounds likewise possess some application for the coloration of wool and silk. The nuclear sulfonated dye compounds of our invention possess little or no application for the coloration of organic derivatives of cellulose but can be employed to color silk and wool. Coloration can be effected by dyeing, printing, stenciling or like methods.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particuarly in connection with the coloration of cellulose acetate, a material to which the invention is especially adapted, it will be understood that it applies to the coloration of other organic derivatives of cellulose such as those just mentioned.

While our invention relates broadly to anthraquinone compounds having a

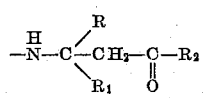

group attached directly to an alpha position of the anthraquinone nucleus, it relates more particularly to the anthraquinone compounds selected from the group consisting of anthraquinone compounds having the general formulas:

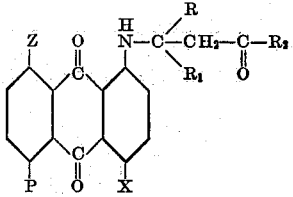

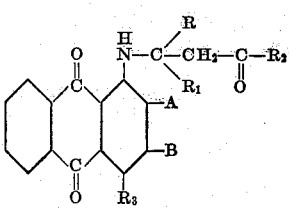

and

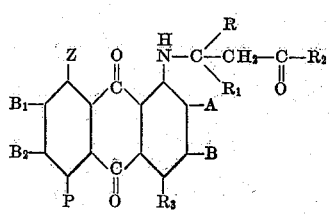

wherein X, Z and P each represents a member selected from the group consisting of hydrogen, a halogen atom, a hydroxy group, an alkoxy group and an amino group, A, B, $B_1$ and $B_2$ each represents a member selected from the group consisting of an alkyl group, an alkoxy group, a halogen atom, a cyano group, a carboxamide group, a sulfonamide group and a hydroxy group, and B, $B_1$ and $B_2$ may be in addition hydrogen, R, $R_1$ and $R_2$ each represents an alkyl group and $R_3$ represents an amino group. Normally R, $R_1$ and $R_2$ represent unsubstituted short chain alkyl groups.

The anthraquinone dye compounds of our invention, generally speaking, can be prepared by condensing a leuco anthraquinone with an amine having the general formula

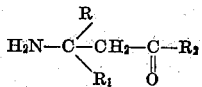

wherein R, $R_1$ and $R_2$ each represents an alkyl group.

Leuco anthraquinones suitable for use are those containing an alpha negative substituent capable of being replaced by an amino group by the action of an amine. Negative substituents capable of such replacement include, for example, the hydroxy group, the nitro group, a halogen atom, such as chlorine or bromine, and an alkoxy group, such as methoxy or ethoxy. One or more of such negative substituents may be present. These will be replaced in whole or in part depending on the conditions under which the condensation reaction is conducted.

The condensation reaction can be carried out in a solvent such as water, ethanol, butanol, pyridine or dimethylaniline, for example. Any leuco dye present in the reaction mixture can be oxidized in the solvent with a suitable oxidizing agent such as air, sodium perborate, hydrogen peroxide or nitrobenzene or the luco dye can be poured into water and oxidize with the above oxidants.

Examples of leuco anthraquinone compounds that can be employed are leuco quinizarin, leuco 1-hydroxy-4-aminoanthraquinone, leuco 1-methoxy-4-aminoanthraquinone, leuco 1-methoxy-4-aminoanthraquinone, leuco 1-chloro (or bromo) anthraquinone and leuco 1-hydroxy-4-chloroanthraquinone. 1-hydroxy-4-nitroanthraquinone and 1-nitroanthraquinone, for example, may likewise be condensed with an amine having the general formula

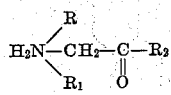

wherein R, R₁ and R₂ each represents an alkyl group, to form compounds included within the scope of our invention.

Substituent groups which can be or are present on the anthraquinone nucleus in addition to the

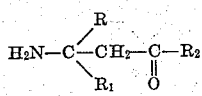

group are often present on the anthraquinone compound undergoing condensation. However, if not thus originally present, they can be introduced into the anthraquinone nucleus by methods known to the art for their introduction.

In order that our invention may be completely understood it is here noted that the term "an amino group" includes not only the unsubstituted amino group but also substituted amino groups such as aliphaticamino, aralkylamino, cycloalkylamino, heterocyclicamino and arylamino groups, for example. An amino group, accordingly, includes the

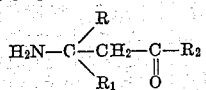

group. Similarly, the term "alkyl" as used herein includes not only unsubstituted alkyl groups such as methyl, ethyl, a propyl or a butyl group but also substituted alkyl groups such as β-hydroxyethyl, β-hydroxypropyl, γ-hydroxypropyl, glyceryl, β-methoxyethyl, β-ethoxyethyl, β-chloroethyl, β-cyanoethyl, β-sulfoethyl, β-sulfatoethyl or β-phosphatoethyl, for example. The term aliphatic, of course, includes alkyl as well as other groups such as vinyl, allyl and crotonyl.

Illustrative aralkyl groups include benzyl and phenyl ethyl. Illustrative cycloalkyl groups include cyclobutyl, cyclohexyl and cycloheptyl. Similarly, illustrative of alkoxy may be mentioned methoxy, ethoxy, propoxy, butoxy and β-ethoxy ethoxy, while furyl, furfuryl, tetrahydrofurfuryl and pyridino are illustrative of heterocyclic. Aryl includes unsubstituted as well as substituted phenyl and naphthyl nuclei. These nuclei can be substituted, for example, with alkyl, hydroxy, alkoxy, halogen and nitro.

The following examples illustrate the preparation of the anthraquinone compounds of our invention:

*Example 1*

24 grams of leuco quinizarin are placed in 200 cc. of butanol together with 10.2 grams of diacetoneamine and the mixture is heated at 90–95° C. until reaction is complete. The time required is ordinarily 48 to 60 hours. The reaction mixture is then poured into water and the leuco dye compound formed oxidized with sodium perborate following which the desired dye compound can be recovered by filtration. The dye compound formed is 1-diacetonylamino-4-hydroxy anthraquinone. This dye compound colors cellulose acetate silk purple.

By the substitution of an equivalent gram molecular weight of leuco-1,4,5,8-tetrahydroxyanthraquinone for the leuco quinizarin of the example, 1-diacetonylamino-4,5,8-trihydroxyanthraquinone can be obtained.

*Example 2*

24 grams of leuco quinizarin, 150 cc. of butanol and 25 grams of diacetoneamine are heated together over a water bath at 90–95° C. until reaction is complete. this being about 60 hours. The resulting leuco dye formed is oxidized by adding 10 cc. of pyridine to the reaction mixture and passing in air. The desired dye compound separates on adding 20 cc. of water and cooling. 1,4-diacetonylaminoanthraquinone is obtained. This compound colors cellulose acetate silk blue.

By the substitution of an equivalent gram molecular weight of 1,4,5,8-tetrahydroxyanthraquinone for the leuco quinizarin of the example, 1,4-diacetonylamino-5,8-dihydroxyanthraquinone can be obtained. This dye compound colors cellulose acetate silk bluish green.

*Example 3*

24 grams of leuco quinizarin, 10.2 grams of diacetoneamine and 4 grams of methylamine are heated in 200 cc. of pyridine for 60–80 hours at 90–95° C. The resulting leuco dye compound formed is oxidized by passing air or oxygen into the hot reaction mixture. Following the oxidation the pyridine reaction mixture is concentrated and the desired dye compound is recovered by filtration, washed with methanol and dried. 1-methylamino-4-diacetonylaminoanthraquinone is obtained and colors cellulose acetate silk blue.

An equivalent gram molecular weight of ethylamine, propylamine, isopropylamine, butylamine, laurylamine, cetylamine, allylamine, benzylamine, cyclohexylamine, β-hydroxyethylamine or tetrahydrofurfurylamine, for example, can be substituted for the methylamine of the example to obtain corresponding dye compounds but in which the methylamino group is replaced by the amine groups mentioned.

The compound of the above example can likewise be obtained by reacting 28.2 grams of 1-methylamino-4-nitroanthraquinone in pyridine at 90–95° C. with 20 grams of diacetoneamine until reaction is complete.

*Example 4*

27 grams of leuco 1,4-diamino-5,8-dihydroxyanthraquinone, 200 cc. of butanol, 11 grams of diacetoneamine and 11 grams of tetrahydrofurfurylamine are heated at 90–95° C. for 48–60 hours. The resulting leuco dye formed is oxidized by pouring the reaction mixture into water and oxidizing with sodium perborate. The dye compound obtained upon filtration of the reaction mixture is 1-diacetonylamino-4-tetrahydrofurfurylamino - 5,8 - dihydroxyanthraquinone. This dye compound colors cellulose acetate silk bluish-green shades.

Equivalent gram molecular weights of furfurylamine and γ-tetrahydrofurfurylpropylamine can be substituted for the tetrahydrofurfurylamine of the example to obtain corresponding dye compounds of our invention.

*Example 5*

18 grams of quinizarin, 6 grams of leuco quinizarin, 200 cc. of butanol, 11 grams of diacetoneamine and 11 grams of benzylamine are heated together at 90–95° C. for 48 to 60 hours. The resulting leuco dye mixture is worked up as previously described. The dye compound obtained is 1-benzylamino-4-diacetonylaminoanthraquinone. This dye compound colors cellulose acetate silk blue.

Equivalent gram molecular weights of hexahydrobenzylamine, p-methoxybenzylamine, cyclohexylamine and cyclohexanolamine can be substituted for the benzylamine of the example to obtain dye compounds of our invention. Similarly, an equivalent gram molecular weight of

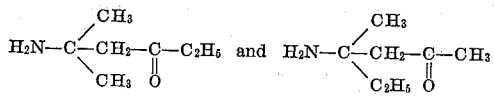

can be substituted for the diacetoneamine of the example to obtain dye compounds similar to that of the example but in which the diacetonylamino group is replaced by the residue of the amine groups just shown.

*Example 6*

10 grams of 2-aminothiophene are substituted for the benzylamine of Example 5 and the reaction conducted as described therein to obtain the dye 1-diacetonylamino-4-thienylamino-anthraquinone. This dye compound colors cellulose acetate silk blue.

An equivalent gram molecular weight of 3-aminofuran, 2-aminopyridine, aminocarbazole or thiazylamine can be substituted for the 2-aminothiazine of the example to obtain dye compounds of our invention.

*Example 7*

24 grams of leuco quinizarin, 11 grams of diacetoneamine and 10 grams of aniline are heated in 150 cc. of butanol at 90–95° C. for 48–60 hours. The reaction mixture is worked up as previously described. The dye compound obtained is 1-diacetonylamino - 4 - phenylaminoanthraquinone. This dye compound colors cellulose acetate silk blue. Equivalent gram molecular weights of p-phenylenediamine, mono - β - hydroxyethyl-p-phenylenediamine, hexahydro - p - phenylenediamine, 1-amino-4-ethylaminobenzene and 1-amino-4-dimethylaminobenzene, for example, can be substituted for the aniline of the above example to obtain dye compounds of our invention.

*Example 8*

27 grams of 1,5-dihydroxy-4,8-diaminoanthraquinone are heated with 75 grams of diacetoneamine on a water bath until no further color change takes place. On cooling, the dye formed separates from the reaction mixture following which it is recovered by filtration, washed with methanol and dried. The dye obtained is 1,5-diacetonylamino - 4,8 - diaminoanthraquinone. This compound colors cellulose acetate silk bluish green. By the use of a mixture of diacetonamine and ethanolamine, a dye compound containing the diacetonylamino and the β-hydroxyethylamino group substituted in the 1 and 5 positions can be obtained.

*Example 9*

25 grams of 1-methoxy-4-aminoanthraquinone are treated in 500 cc. of pyridine with 11 grams of

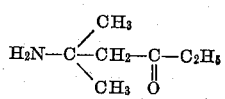

on a water bath until no further color change takes place. The desired dye compound is obtained by concentration of the pyridine solution followed by filtration after which the dye compound is washed with methanol and dried. The dye compound obtained is

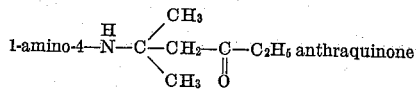

*Example 10*

27 grams of leuco-1,4,5,8-tetraaminoanthraquinone are reacted with 11 grams of diacetonamine and 11 grams of ethanolamine in 200 cc. of butanol at 90–95° C. for 48–60 hours. The reaction mixture is worked up as described in the foregoing examples. The dye obtained is 1-β-hydroxyethylamino - 4 - diacetonylamino - 5,8 - diaminoanthraquinone and colors cellulose acetate silk bluish green.

By the substitution of an equivalent gram molecular weight of ethylenediamine for the ethanolamine of the example, a dye compound in which the β-hydroxyethylamino group is replaced by the residue of ethylenediamine is obtained.

*Example 11*

40 grams of 1-diacetonylamino-4-bromoanthraquinone are dissolved in pyridine and treated with 20 grams of tetrahydrofurfurylamine and 1 gram of copper powder at 120° C. When no further color change takes place the reaction mixture is cooled and the desired dye compound recovered by filtration, washed and dried. The dye obtained is 1-diacetonylamino-4-tetrahydrofurfurylaminoanthraquinone. This dye compound colors cellulose acetate silk blue.

*Example 12*

43 grams of 1-diacetonylamino-3-bromo-4-methylaminoanthraquinone, 600 cc. of ethylene glycol and 125 grams of potassium hydroxide are heated together at 80° C. until no further color change takes place. The dye compound formed is recovered by filtration, washed with water and dried. The dye compound obtained is 1-diacetonyl-3-β-hydroxyethoxy -4- methylaminoanthraquinone. This dye compound colors cellulose acetate silk blue.

An equivalent gram molecular weight of methanol, tetrahydrofurfuryl alcohol, cetyl alcohol and diethylene glycol, for example, can be substituted for the ethylene glycol of the example to obtain dye compounds of our invention.

Example 13

47 grams of

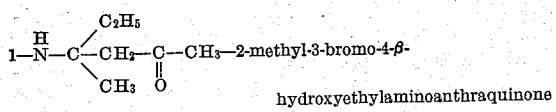
2-methyl-3-bromo-4-β-hydroxyethylaminoanthraquinone 800 cc. of diethylene glycol and 125 grams of potassium hydroxide are heated together at 80° C. until no further color change takes place. The dye compound formed is recovered by filtration, washed with water and dried. In the reaction which takes place the bromine atom is replaced by a $-O-C_2H_4OC_2H_4OH$ group. The dye compound obtained colors cellulose acetate silk blue.

Example 14

100 grams of sodium-1-diacetonylamino-2-methoxy - 4 - tetrahydrofurfurylaminoanthraquinone-3-sulfonate, 700 grams of tetrahydrofurfuryl alcohol and 80 grams of sodium hydroxide are heated at 100–130° C. for several hours. Methanol is added to the reaction mixture following which the crystals of the desired dye compound are recovered by filtration and washed with water.

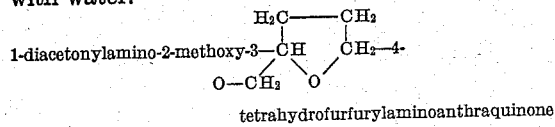
1-diacetonylamino-2-methoxy-3-tetrahydrofurfurylaminoanthraquinone is obtained. This dye compound colors cellulose acetate silk blue.

Example 15

100 grams of sodium-1-diacetonylamino-2-ω-hydroxy - methyl - 4 - p - aminophenylaminoanthraquinone-3-sulfonate are heated with 800 cc. of triethylene glycol in accordance with the method described in Example 14. In the reaction which takes place the sulfonic group in the 3-position is replaced by a $-OC_2H_4OC_2H_4OC_2H_4OH$ group. The dye compound obtained colors cellulose acetate silk bluish green.

Example 16

34.6 grams of 1-methylamino-2-methoxy-4-bromoanthraquinone, 300 cc. of pyridine, 1 gram of activated copper powder and 50 grams of diacetoneamine are heated at 90–150° C. in an autoclave for 5–50 hours depending upon the temperature selected for the reaction. Following the reaction the pyridine solution is concentrated and the dye compound obtained by filtration is washed and dried. The reaction product is 1-methylamino - 2 - methoxy - 4 - diacetonylaminoanthraquinone. This dye compound colors cellulose acetate silk blue.

Example 17

36.7 grams of 1-allylamino-2-cyano-4-bromoanthraquinone are reacted with diacetoneamine in accordance with the procedure described in Example 16. The reaction product obtained is 1 - allylamino - 2 - cyano - 4 - diacetonylaminoanthraquinone.

If desired the cyano group present in the 2 position may be hydrolyzed to its acid form and then esterified.

Example 18

44 grams of 1-cyclohexylamino-4-bromoanthraquinone-3-carboxamide are reacted with diacetoneamine in accordance with the general method described in Example 16. In the reaction which takes place the bromine atom is replaced by a diacetonylamino group. The dye compound obtained colors cellulose acetate silk blue.

Example 19

49.4 grams of 1-diacetonylamino-4-bromo-5-aminoanthraquinone-3-sulfonamide are reacted with 50 grams of morpholine in a pyridine solution in accordance with the method described in Example 16. In the reaction which takes place the bromine atom in the 4 position is replaced by the morpholine group. The dye compound obtained colors cellulose acetate silk greenish-blue.

Example 20

39 grams of 1-β-methoxyethylamino-2-bromo-4-methoxyanthraquinone are treated with 20 grams of diacetoneamine in boiling methanol. When no further color change takes place the mixture is allowed to cool and the dye compound formed is recovered by filtration, washed and dried. The dye compound obtained is 1-β-methoxyethylamino - 2 - bromo - 4 - diacetonylaminoanthraquinone. This compound colors cellulose acetate silk blue.

Example 21

36 grams of 1-diacetonylamino-3-amino-4-methoxyanthraquinone are reacted with 20 grams of diacetoneamine in accordance with the method described in Example 20. 1,4-diacetonylamino-3-aminoanthraquinone is obtained as a reaction product. This compound colors cellulose acetate silk violet.

Example 22

37.8 grams of 1-methylamino-2-methoxy-4-bromo-5,8-dihydroxyanthraquinone are placed in 300 cc. of pyridine together with 1 gram of activated copper powder and 50 grams of diacetoneamine and the reaction mixture is heated at 80–150° C. in an autoclave for 5–50 hours until reaction is complete. Following this the reaction mixture is concentrated and the desired dye compound recovered by filtration, washed with methanol and dried. The reaction product is 1 - methylamino - 2 - methoxy - 4 - diacetonylamino-5,8-dihydroxyanthraquinone and colors cellulose acetate silk greenish-blue.

Example 23

42.2 grams of 1-diacetonylamino-2-cyano-3-methyl-4-methoxy - 5,8-dihydroxyanthraquinone are heated in butanol with 30 grams of ethanolamine until no further color change takes place. In the reaction which takes place the methoxy group in the 4-position is replaced by a β-hydroxyethylamino group. The dye compound obtained colors cellulose acetate silk greenish-blue.

Example 24

100 grams of sodium 2,6-dimethyl-1,5-diacetonylamino - 4- p - aminophenylamino - 8 - hydroxyanthraquinone-3-sulfonate are heated in 800 cc. of ethylene glycol with sodium hydroxide in accordance with the method described in Example 14. In the reaction which takes place the sulfonic group in the 3-position is replaced by a β-hydroxyethoxy group. The dye compound obtained colors cellulose acetate silk bluish green shades.

Example 25

100 grams of disodium-2,6-dichloro-1-diacetonylamino - 4 - para-aminocyclohexylamino-5,8 - dimethylaminoanthraquinone - 3,7 - disulfonate are reacted with 800 cc. of diethylene glycol in accordance with the general method described in Example 14. In the reaction which takes place the sulfonic groups present in the 3 and 7 positions are replaced with a —O—$C_2H_4OC_2H_4OH$ group.

*Example 26*

24 grams of leuco quinizarin are placed in 200 cc. of butanol together with 0.1 gram mole of diacetoneamine and 0.1 gram mole of

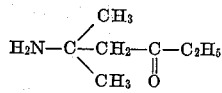

and the mixture is heated at 90–95° C. for 48–60 hours. The reaction mixture resulting is then poured into water and the leuco dye compound formed oxidized with sodium perborate following which the desired dye compound can be recovered by filtration. The dye compound formed is

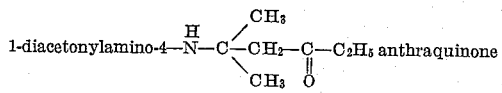

It colors cellulose acetate silk blue.

Similarly 0.1 gram mole of

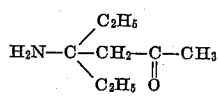

for example, can be substituted for the

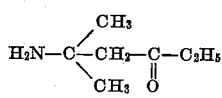

of the example to obtain

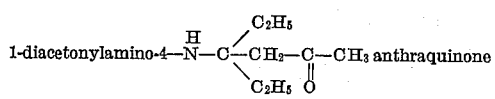

Numerous other examples could be given illustrating the preparation of the anthraquinone compounds of our invention but it is believed that the foregoing examples amply teach their preparation. It will be noted that while most of the examples disclose the preparation of compounds containing a diacetonylamino group compounds containing a

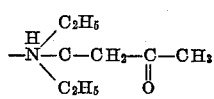

a

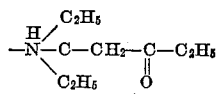

a

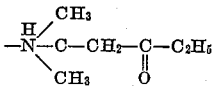

a

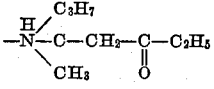

or a

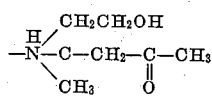

group, for example, can be prepared by substituting the appropriate amine for the diacetoneamine of said examples.

Again, it will be understood that where the anthraquinone compound is to contain 2 or more amino groups such groups can be introduced simultaneously, as shown herein, or stepwise. Where the latter procedure is employed, the anthraquinone starting compound is reacted with one amine until an equivalent gram molecular weight of the amine is introduced, following which the compound thus formed is suitably separated and reacted with the next amine until it has been introduced into the anthraquinone nucleus.

Nuclear sulfonated compounds suitable for the dyeing of wool and silk can be prepared by sulfonating, for example, the various unsulfonated compounds disclosed in the examples. Sulfonation can be effected employing chlorosulphonic acid or concentrated sulphuric acid.

The anthraquinone dye compounds of our invention can be applied to the coloration of organic derivatives of cellulose such as cellulose acetate silk by the well known dispersion method. In accordance with this method of dyeing, the insoluble dye or dye mixture can be first ground to a fine powder, intimately mixed with a suitable dispersing or solubilizing agent following which the resulting mixture is added to water or a dilute solution of soap in water to form an aqueous dyebath. After this known preparation of the dyebath, the textile materials, for example, to be dyed may be added to the dyebath and the dyeing operation conducted in known fashion. Suitable dispersing or solubilizing agents that can be employed include soap, sulphoricinoleic acid.

The following example illustrates how dyeing may be carried out in accordance with our invention. Quantities are expressed in parts by weight.

*Example A*

2 parts of the dye compound of Example 3 are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk in the form of yarn or fabric, for example, are added to the dyebath after which the temperature is gradually raised to 80–85° C. and the silk worked at this temperature until dyeing is complete. Sodium chloride may be added as desired during the dyeing operation to promote exhaustion of the dyebath. Upon completion of the dyeing operation, the cellulose acetate silk is removed, washed with soap, rinsed and dried. The cellulose acetate silk is colored a blue shade of good fastness to light and washing.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the example or by substitution of both the material being dyed and the dye compound of the example. Wool and silk can be colored with the anthraquinone dyes of our invention in accordance with the methods known to the art for the coloration of these materials with anthraquinone dyes. It will be understood, however, that these materials can be colored in accordance with the dispersion method of dyeing just described.

We claim:

The anthraquinone compound having the formula:

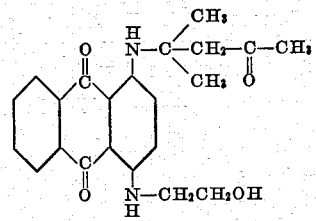

JOSEPH B. DICKEY.
JAMES G. McNALLY.